United States Patent [19]

Kotzur

[11] Patent Number: 4,693,130
[45] Date of Patent: Sep. 15, 1987

[54] MAGNETIC BEARING SUPPORT GEAR TRAIN

[75] Inventor: Joachim Kotzur, Oberhausen, Fed. Rep. of Germany

[73] Assignee: M.A.N.Maschinenfabrik Augsburg-Nürnberg AG, Fed. Rep. of Germany

[21] Appl. No.: 810,653

[22] Filed: Dec. 18, 1985

[30] Foreign Application Priority Data

Dec. 19, 1984 [DE] Fed. Rep. of Germany ....... 3446211

[51] Int. Cl.⁴ ............................................. F16H 35/06
[52] U.S. Cl. ...................................... 74/397; 74/398; 74/803
[58] Field of Search ................. 310/90.5; 74/397, 398, 74/396, 803, 665 GA, DIG. 4

[56] References Cited

U.S. PATENT DOCUMENTS

| | | | |
|---|---|---|---|
| 1,847,611 | 3/1932 | Hodgkinson | 74/398 |
| 2,192,881 | 3/1940 | Bothezat | 74/803 |
| 2,337,501 | 12/1943 | Schmidt | 74/410 |
| 2,920,497 | 1/1960 | Wiken | 74/398 X |
| 3,079,574 | 2/1963 | Garcia | 310/90.5 X |
| 3,160,025 | 12/1964 | Dresser | 74/409 |
| 3,314,310 | 4/1967 | Quenneville | 74/803 X |
| 3,824,875 | 7/1974 | Willert et al. | 74/665 GA |
| 3,845,995 | 11/1974 | Wehde | 310/90.5 |
| 4,136,580 | 1/1979 | Brand et al. | 74/665 GA |
| 4,294,493 | 10/1981 | Sindlinger et al. | 310/90.5 |
| 4,370,004 | 1/1983 | Morikawa et al. | 310/90.5 |
| 4,392,693 | 7/1983 | Habermann et al. | 310/90.5 |
| 4,414,859 | 11/1983 | Holthoff | 74/398 X |
| 4,483,570 | 11/1984 | Inoue | 310/90.5 |
| 4,523,896 | 6/1985 | Lhenry et al. | 310/90.5 |

FOREIGN PATENT DOCUMENTS

| | | |
|---|---|---|
| 1202392 | 10/1965 | Fed. Rep. of Germany . |
| 1575005 | 2/1970 | Fed. Rep. of Germany . |
| 3220851 | 12/1983 | Fed. Rep. of Germany . |
| 3326619 | 2/1985 | Fed. Rep. of Germany . |
| 1318232 | 1/1963 | France . |
| 439820 | 9/1948 | Italy ................................... 74/803 |
| 65414 | 4/1982 | Japan ................................. 310/90.5 |
| 187113 | 10/1984 | Japan ................................. 310/90.5 |
| 8500859 | 2/1985 | Japan .................................... 74/803 |
| 2109596 | 6/1983 | United Kingdom .............. 310/90.5 |
| 800463 | 1/1981 | U.S.S.R. ................................ 74/398 |

OTHER PUBLICATIONS

IEEE Spectrum (Sep. 1979); Practical Magnetic Bearings by Habermann & Liard, pp. 26–30.

Primary Examiner—Leslie Braun
Assistant Examiner—Dwight G. Diehl
Attorney, Agent, or Firm—McGlew and Tuttle

[57] ABSTRACT

A gear train comprises a central wheel for rotation about a central axis and a plurality of pinions engaged with either inner or out circumferential teeth of the central wheel. The pinions are mounted on shafts and have teeth which are meshed with the teeth of the central wheel. A relative position of the pinion and central wheel teeth is influenced through external adjusting forces applied to the wheel and pinions. To this end, the pinions are mounted in active magnetic bearings whose magnetic force is controlled through sensors which sense the radial position of the central wheel. In this way, the radial position of the pinion shafts can be controlled using the magnetic bearings and as a function of the radial position of the circumference of the central wheel to maintain a desired spacing between the wheel and pinion teeth. This control can be used to compensate for centrifugal and thermal expansion or contraction forces.

6 Claims, 6 Drawing Figures

MAGNETIC BEARING SUPPORT GEAR TRAIN

FIELD AND BACKGROUND OF THE INVENTION

The present invention relates to a gear train with a central wheel, at the circumference of which one or more pinions are arranged with are mounted in a gear case and which drive the central wheel or are driven by it. The position of the pinion serration or teeth relative to the central wheel serration or teeth is influenced through external adjusting forces.

Such gear trains are used, e.g. for multi-shaft compressors, in which overhung or cantilevered radial compressor stages are arranged on the pinion shafts, which run at different speeds to maintain an optimum volumetric rate of flow. The function of the central wheel of the gearing is, in combination with the pinion shafts, to establish the correct rpm transmission from the drive and at the same time a sufficiently large radial spacing between the rotors and the spiral housings surrounding the rotors. The central wheel is generally driven by a slowly running electric motor.

With the increasing diameter of the rotors and of the spiral housing, also larger diameters of the central wheel and, at constant rotational speed of the drive, also high circumferential speeds of the central wheel are necessary, which bring about increased mechanical friction losses in the correspondingly enlarged sliding bearings of the central wheel and ventilation losses at the end faces of the gear wheels in the gear case. This effect is intensified with increasing rotational speed of the drive, as for example, in steam turbine drives. It has therefore been proposed to transmit the driving power of the turbine to the central wheel through a pinion disposed on the circumference of the central wheel (French Pat. No. 1,318,232).

In U.S. Pat. No. 2,337,501, a hydraulic adaptation of the pinion shaft position in a spur gear transmission has been described.

In U.S. Pat. No. 3,160,025, an additional torque between the teeth of gears in engagement with one another is produced with permanent magnets.

In German OS No. 33 26 619, a uniform load distribution over the tooth width is brought about for a spur gear transmission with large tooth width by using drives controlled by transducers via signals.

From German OS No. 32 20 851 a magnet bearing with permanent magnets and adjustable support position is known.

In German AS No. 12 02 392 automatic electromagnetic centering of two rotors arranged coaxially one behind the other is described, but here the position of the axis cannot be influenced, as in the case with the known active magnet bearings.

SUMMARY OF THE INVENTION

Starting from this state of the art, the object of the present invention is to provide a gear train which reliably maintains the spacing of the teeth or serrations of the central wheel and of the pinion shafts required for optimum running conditions under heat and centrifugal force related expansions, in particular of the central wheel, even at rapid load variations, and which at the same time has only minimal mechanical friction and ventilation losses.

According to the invention, pinion shafts are mounted in active magnet bearings, whose magnet forces are controlled through sensors disposed on the circumference of the central wheel, in such a way that a given position of the axis of the pinion shafts is displaced so that the tooth engagement ratios are maintained and the central wheel is optimally centered through the teeth or serrations.

The sliding bearings of the shafts of the central wheel can be eliminated if the central wheel is retained by radial centering forces introduced into its rim and if the spacing of the serrations of the central wheel and pinions is reliably maintained.

In cases where the centering forces of the pinion serrations are not sufficient for exactly maintaining the position of the central wheel, the radial centering forces exerted on the central wheel can be supplemented by additional magnets disposed on the circumference of the central wheel, which magnets are also controlled through the sensors disposed on the circumference of the central wheel.

Lastly the possibility exists to exert, through magnetic forces acting at the circumference of the central wheel, also a torque on the central wheel and to drive it in this manner. To this end, motors arranged in the circumferential region radially or on the end face can be used on the principle of linear motors, which are adapted to the slight curvature of the circumference of the central wheel and operate for instance on the reverse of the principle of a known magnet operated suspension railroad (such railroads using a moving magnetic field to move a railroad train). The central wheel then forms the stator (corresponding to the rail) and the pole piece with the magnets and the windings (normally a part of the train) remains fixed. The electric power thus transmitted to the central wheel can serve e.g. to supplement the driving power delivered from a process gas turbine to the central wheel via a pinion shaft, if there is no high speed electric motor, or, if desired, this linear motor can operate as a generator in case of excess driving power.

The axial forces of the central wheel can be absorbed by active axial magnet bearings of the pinion shafts via pressure combs of the pinions, or conversely, the axial forces of the pinion shafts can be absorbed via their pressure combs and the central wheel or rim by axial magnet bearing elements arranged on the end faces thereof.

The lowest mechanical losses result if both the axial forces of the pinion shafts and those of the central wheel are absorbed by axial magnet bearings.

Accordingly, an object of the present invention is to provide a gear train comprising a central wheel having a circumference and at least one pinion engaged with the circumference. The pinion is mounted on the pinion shaft and either drives the central wheel or the central wheel drives the pinion. Both the wheel circumference and pinion have teeth which are meshed with each other. A relative position between the teeth of the pinion and central wheel is influenced through external adjusting forces. The pinion shafts are mounted on active magnet bearings whose magnetic forces are controlled through sensors arranged to sense the position of the central wheel or its rim. A given position of the axis of the pinion shaft is displaced so that a spacing of the teeth of the pinion shaft from the teeth of the central wheel is always maintained. This is also the case when circumferential forces or heat change the position of the axis of the pinion shaft while the axis of the central wheel maintains its position.

Another object of the invention is to provide a gear train which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

The invention will be described below with reference to the drawings which show embodiments thereof and in which.

DESCRIPTION OF THE PREFERRED EMBODIMENTS

Figure 1:
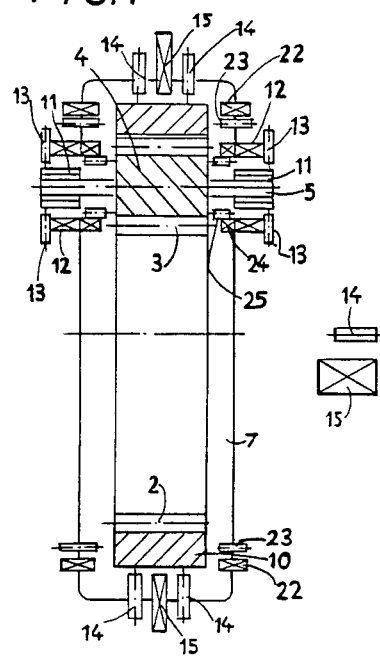
FIG. 1 is a sectional view of a gear train with sensor controlled magnetic pinion shafts and supplementary magnets at the rim.

Referring to the drawings in particular, the invention embodied therein comprises a gear train having a central wheel 10 that is mounted for rotation about a central axis and which has either an inner or outer circumferential teeth or serrations. These are engaged by one or more pinions 4 which also have serrations or teeth. In the figures the same numerals are utilized to designate the same or similar parts.

Figure 2:
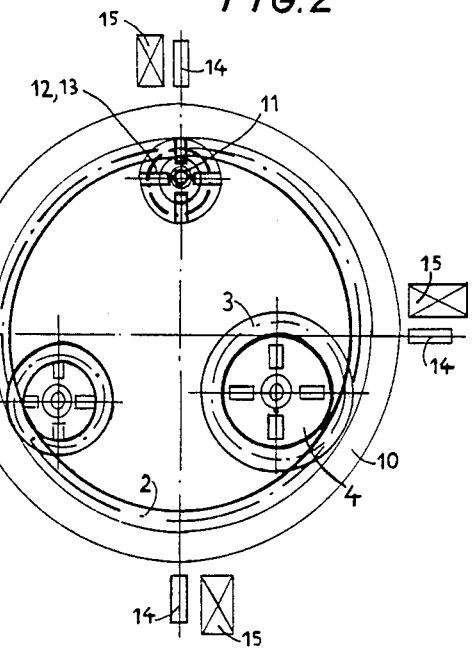
FIG. 2 is a front view of the device shown in FIG. 1.

In FIGS. 1 and 2, the central wheel 10 is in engagement by its serration or teeth 2, with the serration or teeth 3 of the pinions 4, whose shafts 5 are mounted in first radial magnet bearings 12 of the gear case 7. Three pinions 4 are shown. The central wheel 10 has no shaft ends provided with bearing points. The pinion shafts can drive radial compressor stages arranged on them e.g. in overhung fashion, or compressors with separate suspension, as well as electric generators, an may be driven e.g. by steam or process gas turbines or fast running electric motors.

The pinion shafts 5 are provided with sheet packets 11, to avoid eddy current losses. The magnet bearings 12 are each controlled through first radial sensors 13 distributed over the bearing circumference; which hold the pinion shafts 5 in their given radial position, which in turn can be influenced through the pulses of the second radial sensors 14 at the circumference of the central wheel in such a way that the radial spacing of the teeth 3 of the pinions 4 from the teeth 2 of the rim of wheel 10 is preserved. Additional or second radial magnets 15, which are also controlled through the sensors 14, contribute to the correction of the radial position of the rim of wheel 10. Axial magnet bearings 22, controlled through axial sensors 23, absorb the axial thrust of rim of wheel 10. The axial thrust of the pinions 4 is absorbed by further axial magnet bearings 24, which are controlled through further axial sensors 25 arranged axially at the pinion shafts.

Figure 3:
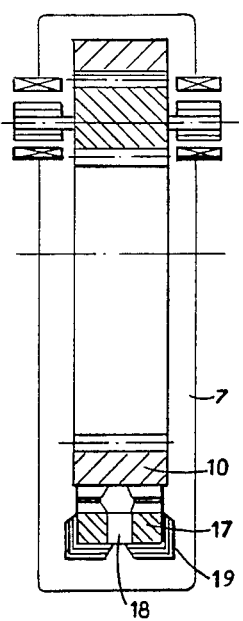
FIG. 3 is a sectional view of a gear train with drive of the central wheel by a linear motor.
Figure 4:
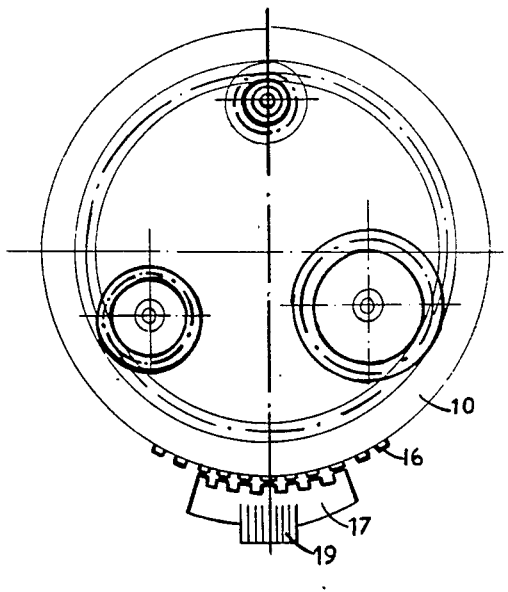
FIG. 4 is a front view of the device shown in FIG. 3.

In FIGS. 3 and 4 a torque is produced at the circumference of wheel 10 by magnetic forces on the principle of the linear motor (reverse of the principle of the magnet operated suspension railroad). Here the central wheel 10 is formed at its outer circumference as a stator 16, which in combination with a pole piece 17, magnet 18 and winding 19, transmits electric drive power to the central wheel 10 to rotate it about its central axis.

Figure 5:
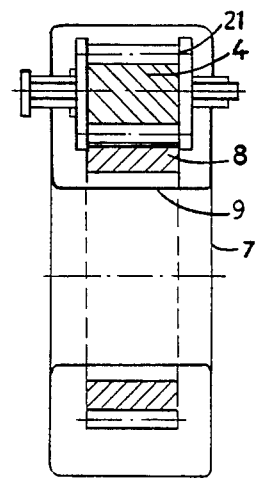
FIG. 5 is a sectional view of a gear train with central wheel formed as a toothed rim with internal liner.
Figure 6:
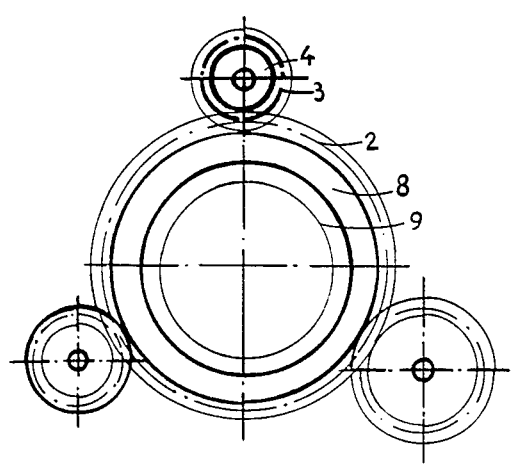
FIG. 6 is a front view of the device shown in FIG. 5.

In FIGS. 5 and 6, the central wheel is formed as a rim or wheel 8 with external teeth serration 2, which is covered internally with a liner 9 attached in the gear case 7, to reduce ventilation losses. The magnet bearings are illustrated in a simplified form. In this example the thrust of the central wheel 8 is transmitted to the axial magnet bearings of the pinion shafts via pressure combs 21 of the pinions 4.

While specific embodiments of the invention have been shown and described in detail to illustrate the application of the principles of the invention, it will be understood that the invention may be embodied otherwise without departing from such principles.

LIST OF THE REFERENCE SYMBOLS:
FIGS. 1 and 2:
2. Teeth of the central wheel or rim
3. Teeth of pinions 4
4. Pinions
5. Pinion shafts
7. Gear case
10. Rim with internal serration as central wheel
11. Sheet packet
12. Active magnet bearing (radial)
13. Sensor at the pinion shaft (radial)
14. Sensor at the central wheel (radial)
15. Magnet bearing element (radial)
22. Magnet bearing element (axial)
23. Sensor at the central wheel (axial)
24. Active magnet bearing (axial)
25. Sensor at pinion shaft (axial)
FIGS. 3 and 4:
16. Stator of the linear motor
17. Pole piece of linear motor
18. Magnet of linear motor
19. Winding of linear motor
FIGS. 5 and 6:
8. Rim with external serration as central wheel
9. Liner
21. Pressure comb of the pinions

What is claimed is:

1. A gear train comprising a gear case, a central wheel having a toothed circumference and mounted for rotation about a central axis in said gear case, a plurality of toothed pinion spaced around and engaged with said central wheel for rotation with rotation of said central wheel and to hold said central wheel centrally on its central axis, said tooth pinion each having a pinion shaft, first radial magnet bearings receiving each pinion shaft and exerting radial magnetic forces on each pinion shaft, a first radial sensor connected to each said first said radial magnet bearings for controlling each first radial magnet bearing to maintain a radial position of each pinion shaft, second radial sensor for sensing a radial position of said central wheel and being connected to said first radial magnet bearings, said first radial bearings are controlled by said first and second sensors to displace the radial position of each respective pinion shaft for maintain a selective spacing between teeth of said central wheel and of each pinion whereby said spacing is changable to correct for circumferential forces and for heat forces.

2. A gear train according to claim 1, wherein said central wheel has a rim having a curved circumference, a stator connected to said curved circumference and rotatable therewith, at least one magnetic pole piece fixed to said case, a plurality of windings on said pole piece and a magnet associated with said pole piece for producing magnetic forces for moving said stator, said central wheel with said stator, said pole piece, said windings and said magnet forming a linear motor.

3. A gear train according to claim 1, including an axial magnet bearing axially supporting said central wheel, and axial position sensors connected to said case and interacting with said central wheel for sensing an axial position of said central wheel, said axial position sensors being connected to said axial magnet bearings for adjusting an axial position of said central wheel.

4. A gear train according to claim 3, including a further axial magnet bearing controlling an axial position of each pinion shaft and a further axial position sensor connected to each further axial magnet bearing for controlling each further axial magnet bearing.

5. A gear train according to claim 1, wherein said central wheel has an outer circumferential teeth and an inner surface, a liner connected to said inner surface and disposed between said central wheel and said case.

6. A gear train according to claim 1, wherein said central wheel has teeth on an inner circumference thereof and has an outer rim.

* * * * *